United States Patent
Sako et al.

(10) Patent No.: US 9,412,202 B2
(45) Date of Patent: Aug. 9, 2016

(54) CLIENT TERMINAL, SERVER, AND MEDIUM FOR PROVIDING A VIEW FROM AN INDICATED POSITION

(71) Applicant: Sony Corporation, Tokyo (JP)

(72) Inventors: Yoichiro Sako, Tokyo (JP); Takatoshi Nakamura, Kanagawa (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 13/751,370

(22) Filed: Jan. 28, 2013

(65) Prior Publication Data
US 2013/0222612 A1    Aug. 29, 2013

(30) Foreign Application Priority Data
Feb. 24, 2012 (JP) ................... 2012-038423

(51) Int. Cl.
*H04N 5/225* (2006.01)
*H04N 5/232* (2006.01)
*G06T 19/00* (2011.01)
*H04N 101/00* (2006.01)

(52) U.S. Cl.
CPC .............. *G06T 19/006* (2013.01); *H04N 5/225* (2013.01); *H04N 5/23293* (2013.01); *H04N 2101/00* (2013.01)

(58) Field of Classification Search
CPC .............. H04N 5/225; H04N 5/23293; H04N 2101/00; G06T 19/006
USPC .................. 348/207.1, 211.2, 211.3, 333.02, 348/333.05, 333.11; 345/632, 633
See application file for complete search history.

(56) References Cited

U.S. PATENT DOCUMENTS

| | | | |
|---|---|---|---|
| 6,037,936 A * | 3/2000 | Ellenby et al. ................. 715/764 |
| 8,254,727 B2 * | 8/2012 | Ko et al. ......................... 382/305 |
| 8,995,716 B1 * | 3/2015 | Zomet et al. ................... 382/103 |
| 2005/0162523 A1 * | 7/2005 | Darrell et al. .............. 348/211.2 |
| 2009/0193021 A1 * | 7/2009 | Gupta et al. ....................... 707/6 |
| 2009/0254528 A1 * | 10/2009 | Tsao et al. ......................... 707/3 |
| 2010/0063997 A1 | 3/2010 | Sako et al. |
| 2010/0268451 A1 * | 10/2010 | Choi ............................... 701/201 |
| 2011/0137561 A1 * | 6/2011 | Kankainen .................... 701/300 |
| 2011/0304750 A1 * | 12/2011 | Lee et al. ................... 348/240.99 |
| 2012/0001939 A1 * | 1/2012 | Sandberg ....................... 345/633 |
| 2012/0038669 A1 * | 2/2012 | Lee et al. ....................... 345/633 |

(Continued)

FOREIGN PATENT DOCUMENTS

| | | |
|---|---|---|
| JP | 08335032 A * | 12/1996 |
| JP | 10-304339 A | 11/1998 |

(Continued)

OTHER PUBLICATIONS

U.S. Appl. No. 13/752,701, filed Jan. 29, 2013, Nakamura, et al.
Japanese Office Action in Japanese Application 2012-038423 issued Nov. 17, 2015.

*Primary Examiner* — John Villecco
(74) *Attorney, Agent, or Firm* — Chip Law Group

(57) ABSTRACT

There is provided a client terminal including a determination unit configured to determine whether an overhead view image is associated with a position indicated by a user, and a display control unit configured to perform control so that the overhead view image is displayed on a display unit in accordance with a determination result obtained by the determination unit.

14 Claims, 11 Drawing Sheets

(56) References Cited

U.S. PATENT DOCUMENTS

| | | |
|---|---|---|
| 2012/0113138 A1* | 5/2012 | Uusitalo et al. ............... 345/629 |
| 2012/0154443 A1* | 6/2012 | Matsui et al. ................. 345/634 |
| 2012/0203460 A1* | 8/2012 | Cho et al. ..................... 345/632 |
| 2012/0216149 A1* | 8/2012 | Kang et al. ................... 715/848 |
| 2013/0150124 A1* | 6/2013 | Kim et al. ................... 455/556.1 |
| 2013/0201216 A1* | 8/2013 | Nakamura et al. ............ 345/633 |
| 2013/0222373 A1* | 8/2013 | Weinstein et al. ............ 345/419 |
| 2013/0321461 A1* | 12/2013 | Filip ............................ 345/632 |

FOREIGN PATENT DOCUMENTS

| | | |
|---|---|---|
| JP | 11-118504 A | 4/1999 |
| JP | 2004-145769 A | 5/2004 |
| JP | 2006-260338 | 9/2006 |
| JP | 2008-147864 A | 6/2008 |
| JP | 2009-060252 A | 3/2009 |
| JP | 2009251720 A * | 10/2009 |
| JP | 2010-128939 | 6/2010 |

* cited by examiner

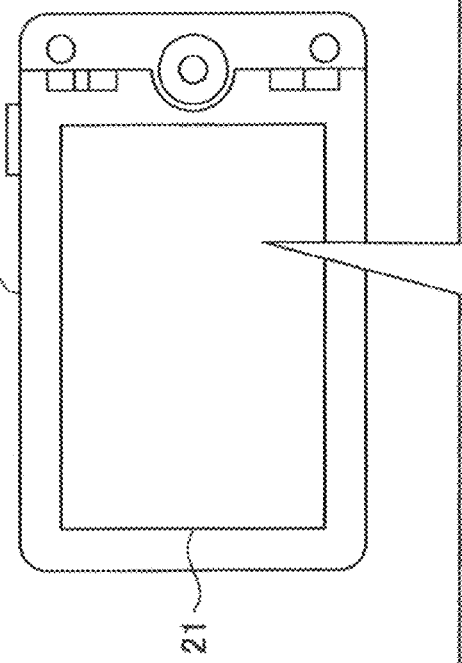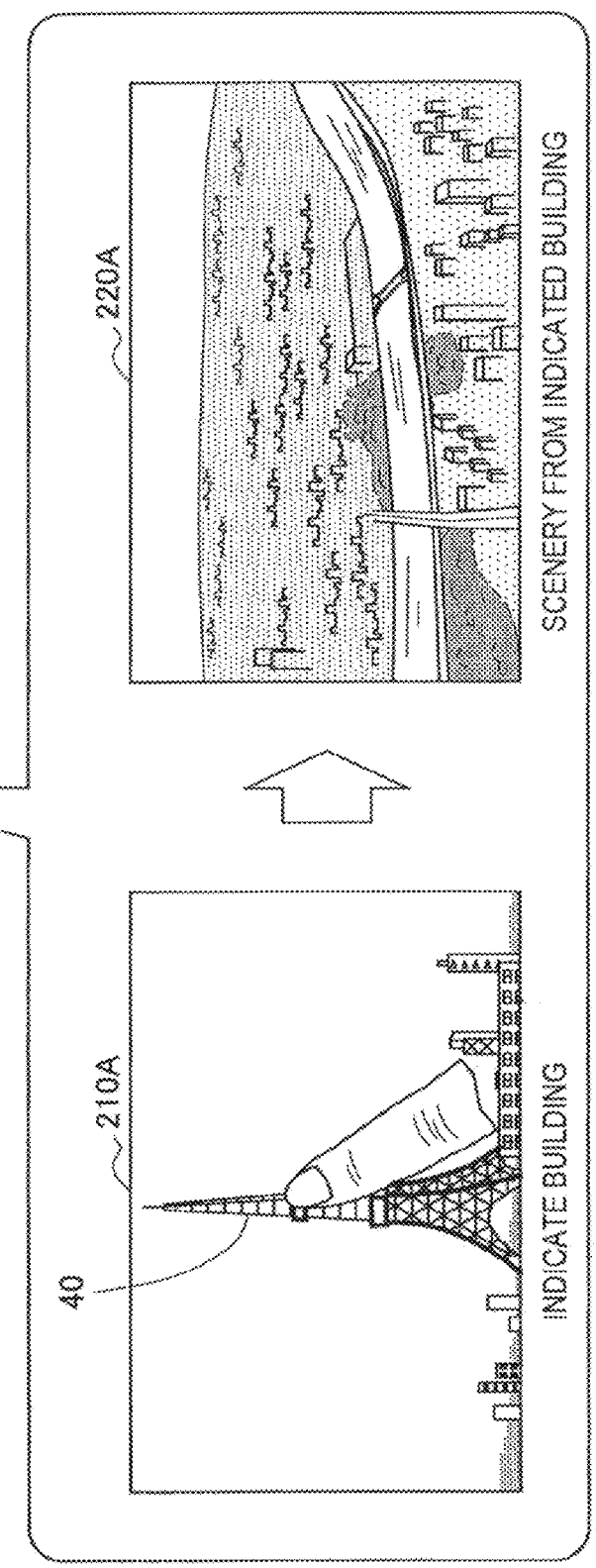

FIG. 8
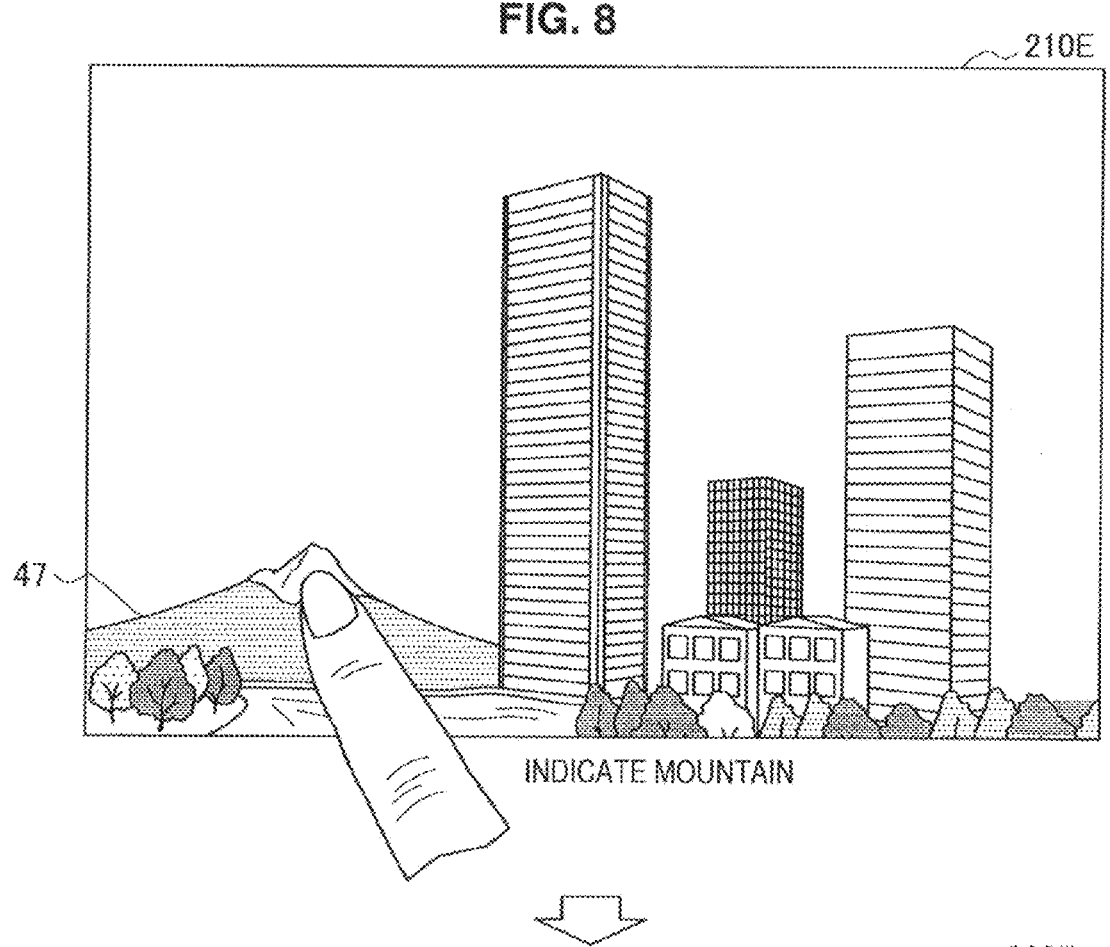
INDICATE MOUNTAIN
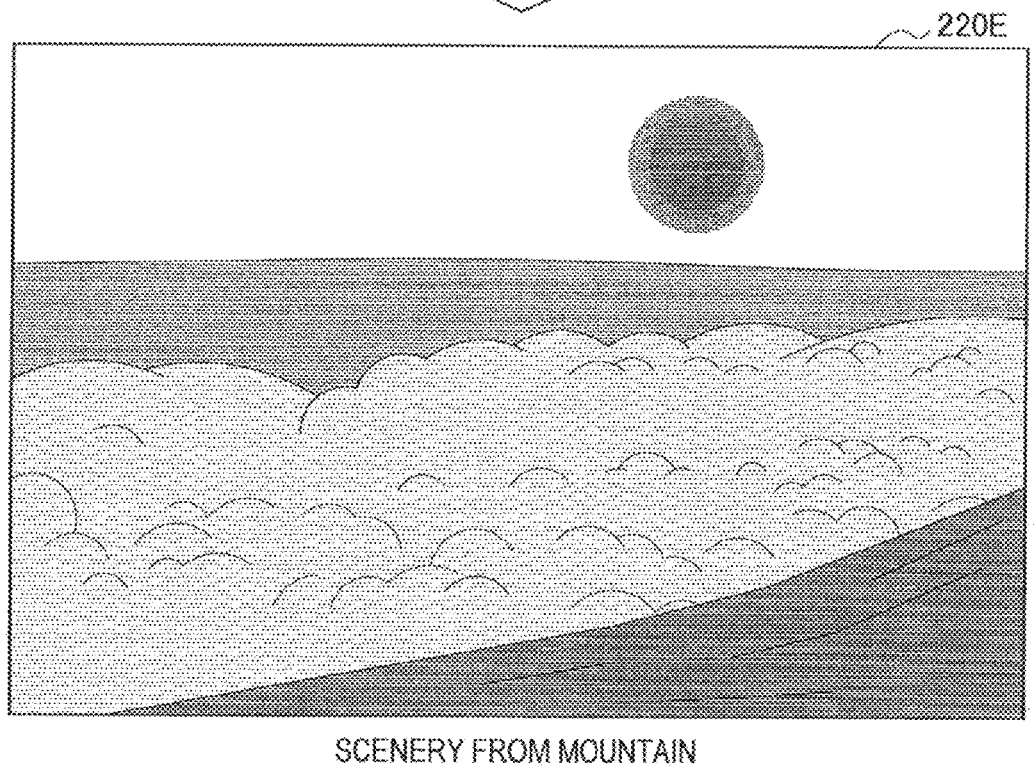
SCENERY FROM MOUNTAIN

FIG. 9
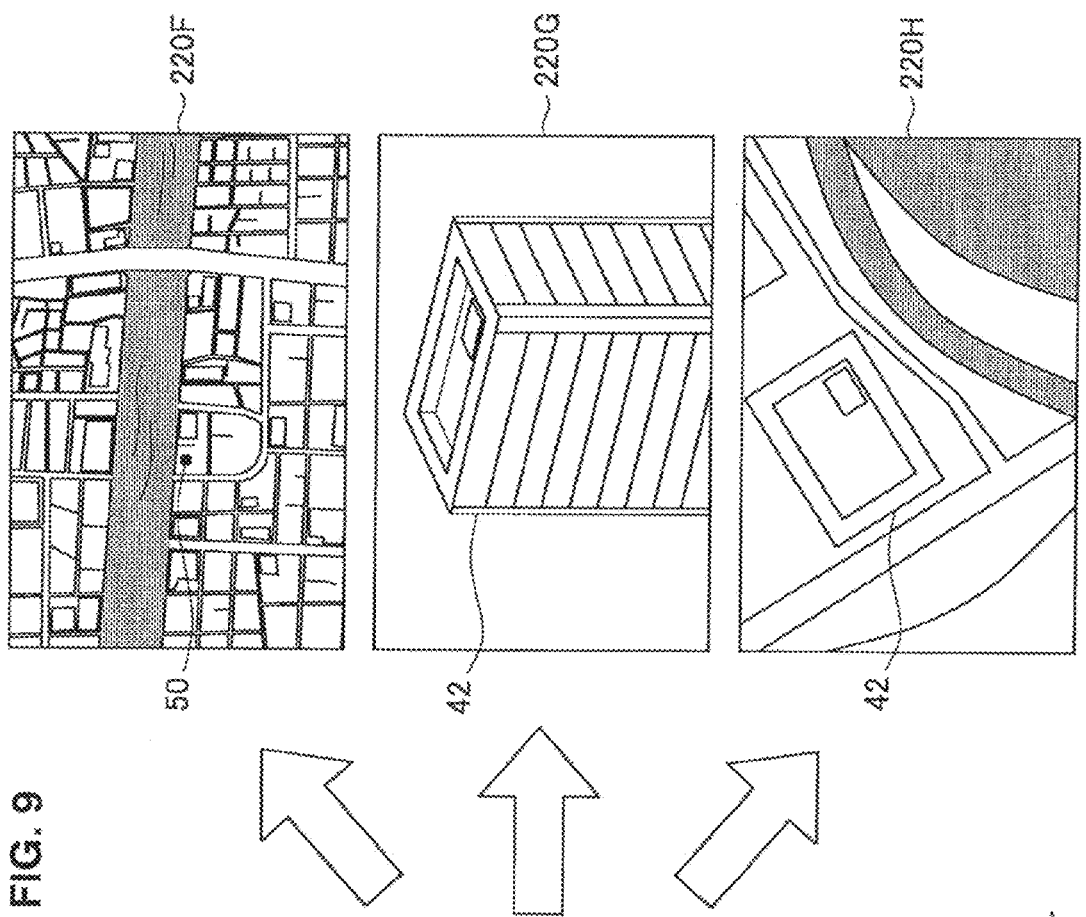
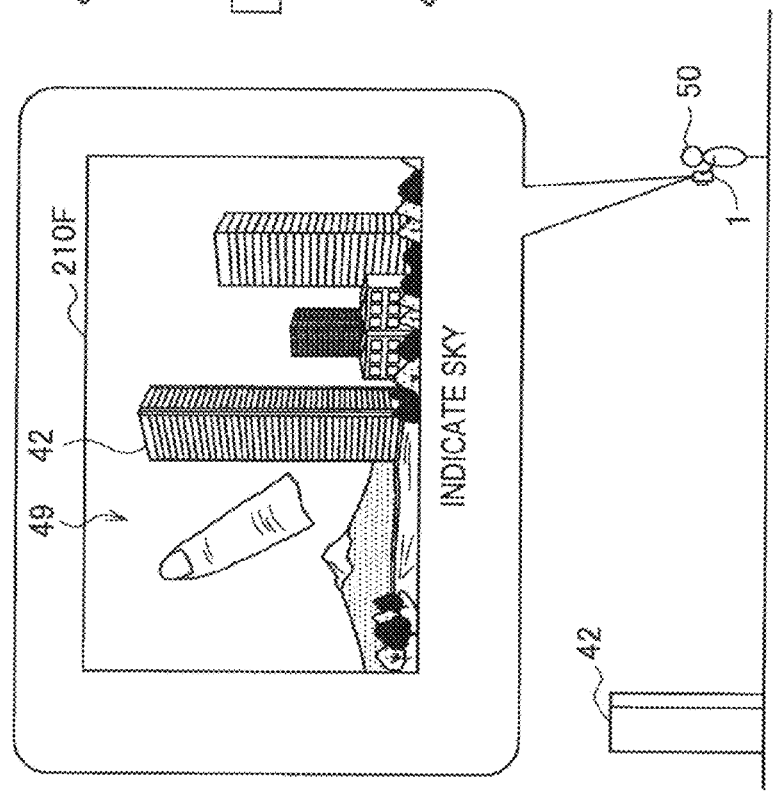

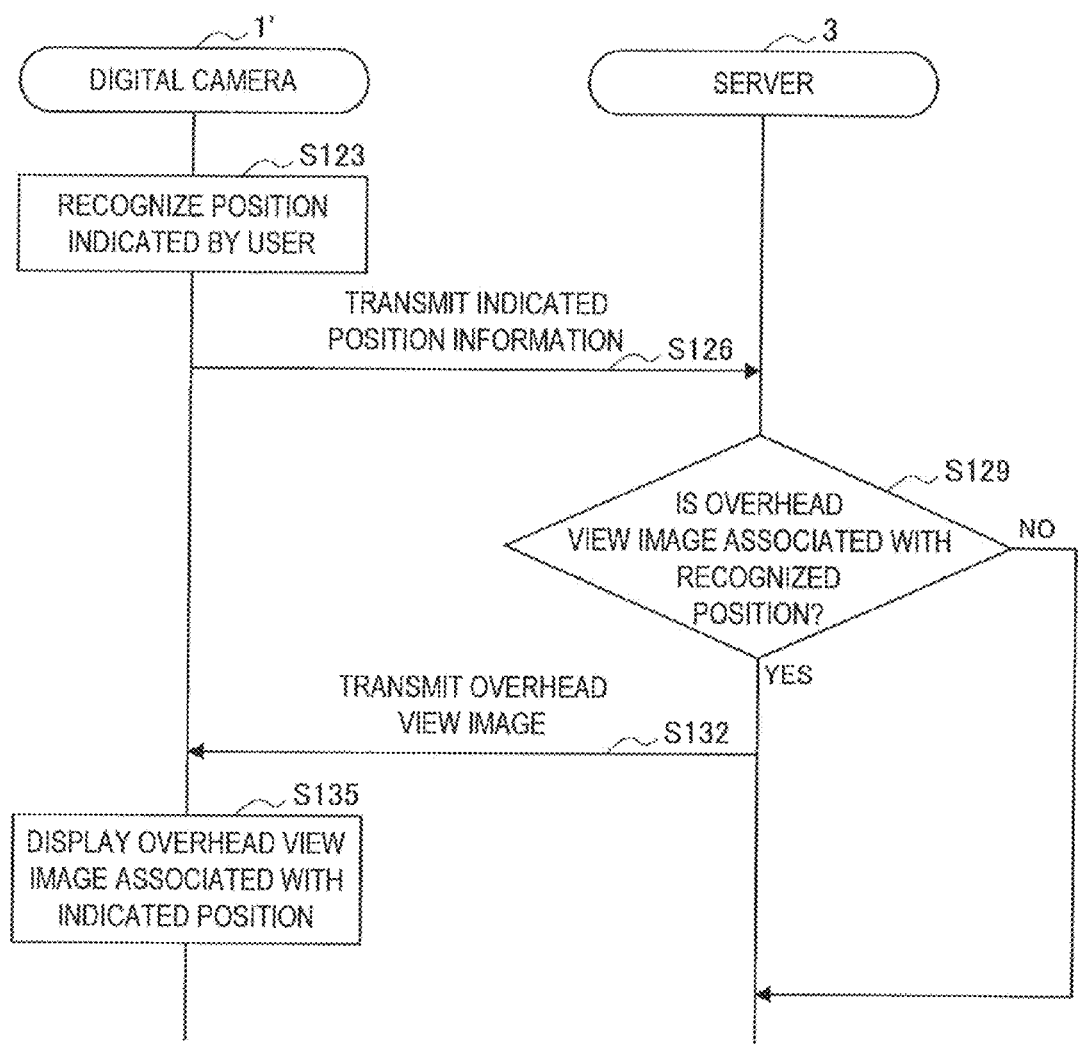

CLIENT TERMINAL, SERVER, AND MEDIUM FOR PROVIDING A VIEW FROM AN INDICATED POSITION

BACKGROUND

The present disclosure relates to a client terminal, a server and a program.

In recent years, a digital camera has been widely used that stores and preserves a subject image in a recording medium as a digital image signal. A user directs the digital camera toward a subject, visually recognizes an image displayed on a viewfinder and presses the shutter button at a given timing.

Here, JP 2006-260338A proposes a digital camera capable of acquiring past and future images of a particular subject as a technology related to the above-mentioned camera. The digital camera described in JP 2006-260338A transmits, to a server, information, for example, a year, month, day and the position of the digital camera in the past indicated by the user. Then, the digital camera acquires, from the server, an image that corresponds to the indicated year, month and day. The digital camera then displays the image acquired from the sever in response to the timing at which the user presses the shutter button.

Meanwhile, JP 2010-128939A proposes a device that converts a viewpoint of an image captured by a camera mounted on a vehicle to generate a bird's eye image in which a three-dimensional object naturally looks as if it is viewed downward from substantially vertically above.

SUMMARY

The digital camera described in JP 2006-260338A allows a user to experience a virtual time travel by displaying past/future images of scenery that the user is currently looking at.

However, a typical digital camera or the digital camera described in JP 2006-260338A only displays an image within an optically visible range in the image capturing direction. Thus, enabling the digital cameras to display images such as a bird's eye image obtained by looking from a different viewpoint from a user's actual viewpoint has not been taken into consideration.

Further, in JP 2010-128939A, a bird's eye image is created based on an image captured by a camera originally mounted on a vehicle. Accordingly, performing display control in connection with a viewpoint absolutely different from a position of a user has not been taken into consideration.

Therefore, the present disclosure proposes a client terminal, a server and a program that are novel and improved and are capable of providing a view from an indicated position.

According to an embodiment of the present disclosure, there is provided a client terminal including a determination unit configured to determine whether an overhead view image is associated with a position indicated by a user, and a display control unit configured to perform control so that the overhead view image in accordance with a determination result obtained by the determination unit is displayed on a display unit.

According to an embodiment of the present disclosure, there is provided a server including a receiving unit configured to receive indicated position information indicative of a position indicated by a user at a client terminal, a determination unit configured to determine whether an overhead view image is associated with the position indicated by the indicated position information, and a transmitting unit configured to transmit to the client terminal the overhead view image associated with the position indicated by the indicated position information in accordance with a determination result obtained by the determination unit.

According to an embodiment of the present disclosure, there is provided a recording medium having a program recorded thereon, the program being configured to cause a computer to execute a determination process for determining whether an overhead view image is associated with a position indicated by a user, and a control process for controlling the overhead view image to be displayed on a display unit in accordance with a determination result obtained in the determination process.

According to an embodiment of the present disclosure, there is provided a recording medium having a program recorded thereon, the program being configured to cause a computer to execute a reception process of receiving indicated position information indicative of a position indicated by a user at a client terminal, a determination process of determining whether an overhead view image is associated with the position indicated by the indicated position information, and a transmitting process of transmitting to the client terminal the overhead view image associated with the position indicated by the indicated position information in accordance with a determination result obtained in the determination process.

According to the above-described embodiments of the present disclosure, it is possible to provide a view from an indicated position.

BRIEF DESCRIPTION OF THE DRAWINGS

FIG. 1 is a diagram illustrating an overview of an observation view system in accordance with an embodiment of the present disclosure;

FIG. 8 is a diagram illustrating an overhead view image displayed when a mountain is indicated;

FIG. 9 is a diagram illustrating an overhead view image displayed when the sky is indicated;

FIG. 11 is a flowchart illustrating a display control process in accordance with the second embodiment of the present disclosure.

DETAILED DESCRIPTION OF THE EMBODIMENT(S)

Figure 2:
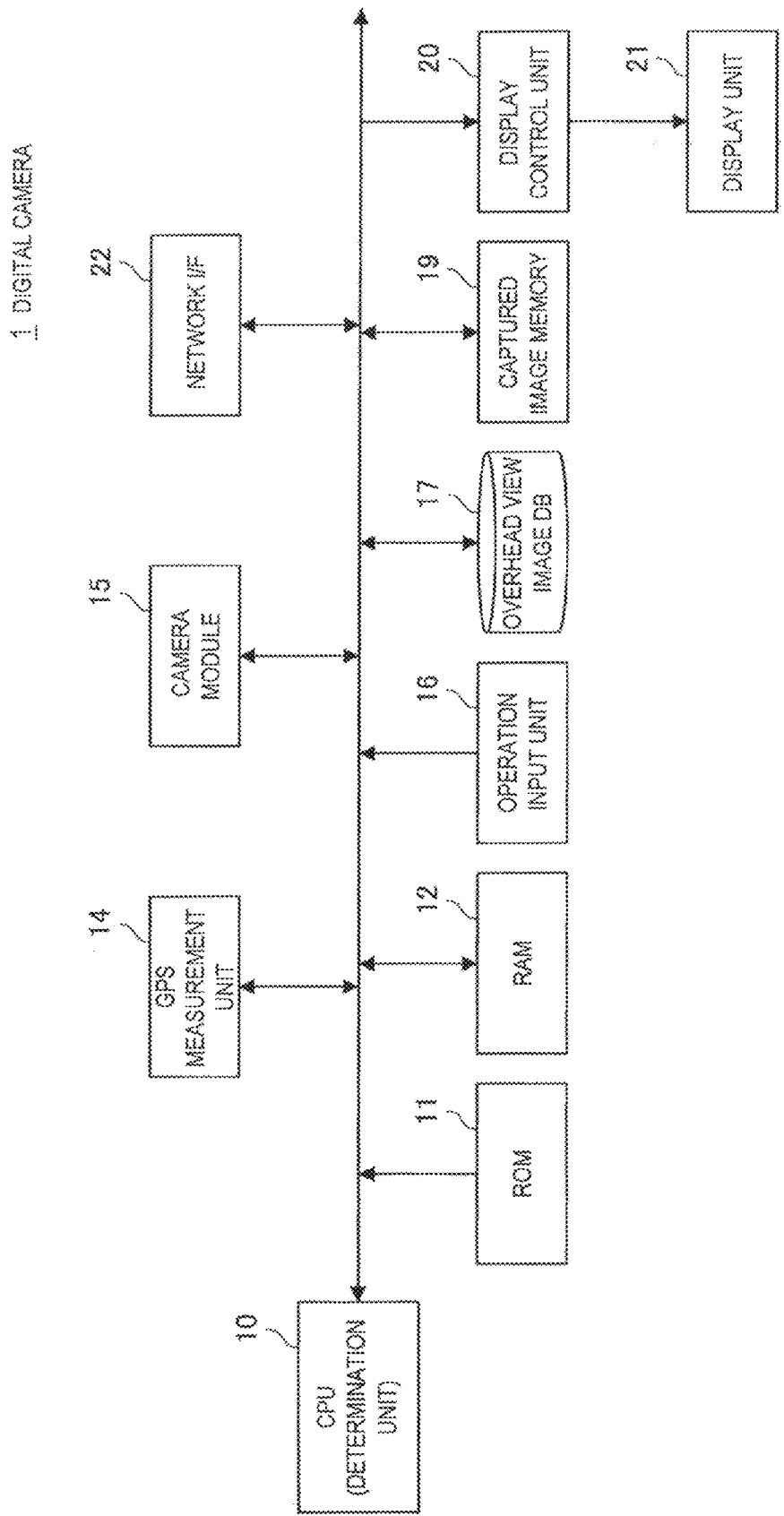
FIG. 2 is a block diagram illustrating the configuration of a digital camera in accordance with a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described in the following order.

1. Overview of observation view system in accordance with an embodiment of the present disclosure
2. Embodiments
2-1. First embodiment
2-1-1. Configuration of digital camera
2-1-2. Display control process
2-1-3. Indication of position
2-1-4. Other Examples of target
2-2. Second embodiment
3. Conclusion

1. OVERVIEW OF OBSERVATION VIEW SYSTEM IN ACCORDANCE WITH AN EMBODIMENT OF THE PRESENT DISCLOSURE

First, an overview of an observation view system in accordance with an embodiment of the present disclosure will be described with reference to FIG. 1. As illustrated in FIG. 1, in a digital camera 1, which is an example of a client terminal in the observation view system in accordance with an embodiment of the present disclosure, an image (a real image 210A) obtained by capturing a real space is displayed first on a viewfinder (a display unit 21). Then, when a user indicates a tower 40 shown in the real image 210A (touches a touch panel stacked on the display unit 21, for example), the digital camera 1 switches display to an overhead view image 220A that is a view (observation view) from an observation platform of the tower 40.

The overhead view image (observation view) displayed herein may include a single or a plurality of images and a view(s) (scene) in any direction (360 degrees).

As described above, in accordance with the present embodiment, since an overhead view image (an observation view) at any height corresponding to a position that the user indicates can be displayed, the user can feel as if he/she instantaneously moved to a building or the like that he/she had indicated in a real image and enjoy scenery from the building.

Such an observation view system is specifically described below with reference to a plurality of embodiments. Additionally, although the digital camera 1 is shown as a client terminal in each embodiment, the client terminal in accordance with each embodiment is not limited thereto. For example, the client terminal may be a video camera, a smartphone with a camera, PDA (Personal Digital Assistants), a PC (Personal Computer), a portable phone, a portable music player, a portable image processing apparatus, a portable game device, a telescope, binoculars or the like. In addition, the client terminal in accordance with the present embodiment is not limited to an apparatus with a camera. For example, the client terminal is applicable to an apparatus capable of indicating a position in an image, for example, an apparatus having a display unit and an operation input unit.

2. EMBODIMENTS

2-1. First Embodiment

An observation view system in accordance with a first embodiment determines whether an overhead view image is associated with a position indicated in the digital camera 1. If associated, the overhead view image is displayed. The configuration, display control and the like of camera 1 in accordance with the first embodiment are sequentially described below.

(2-1-1. Configuration of Digital Camera)

FIG. 2 is a block diagram illustrating the configuration of the digital camera 1 in accordance with the present embodiment. As shown in FIG. 2, the digital camera 1 has a CPU 10, ROM 11, RAM 12, a GPS measurement unit 14, a camera module 15, an operation input unit 16, an overhead view image DB 17, a captured image memory 19, a display control unit 20, a display unit 21 and a network interface (I/F) 22. Each configuration is described below.

The GPS (Global Positioning System) measurement unit 14 receives radio waves from a GPS satellite, detects the position of the digital camera 1 and outputs the detected position information. Additionally, the GPS measurement unit 14 is an example of a position information acquisition unit that detects the position of the digital camera 1 based on an externally acquired signal. The position information acquisition unit may detect the position through transmission to and receipt from WiFi, a portable phone, a PHS, a smart phone or the like, through near field communication or the like, for example.

The camera module 15 includes an image sensor, optics that include an image lens, and a captured image signal processing unit. The camera module 15 outputs data of the captured image as digital signals. Additionally, the image sensor is realized using a CCD (Charge Coupled Device) imager or a CMOS (Complementary Metal Oxide Semiconductor) imager, for example.

The operation input unit 16 is a group of physical keys such as a shutter button, a zoom dial and various types of switches for detecting various types of operations performed by a user, a touch panel stacked on the display unit 21 and the like. The CPU 10 executes a process in response to a user operation input from the operation input unit 16 in accordance with a program in the ROM 11.

The overhead view image DB (Database) 17 is a storage unit that stores an overhead view image with which position information (latitude and longitude) and altitude information are associated. Further, the overhead view image DB 17 may store the overhead view image in association with identification information (name, location or the like) indicative of an object. In the present specification, an overhead view image may be, for example, scenery (view) from a position having a given altitude. Further, an overhead view image may be a panorama image (a view) obtained by looking all around from a position having a given height. The overhead view image DB 17 may also store a plurality of overhead view images that have been captured at the same place (have the same position information), at least one of the height, directions or angles of elevation of which are different.

Figure 3:
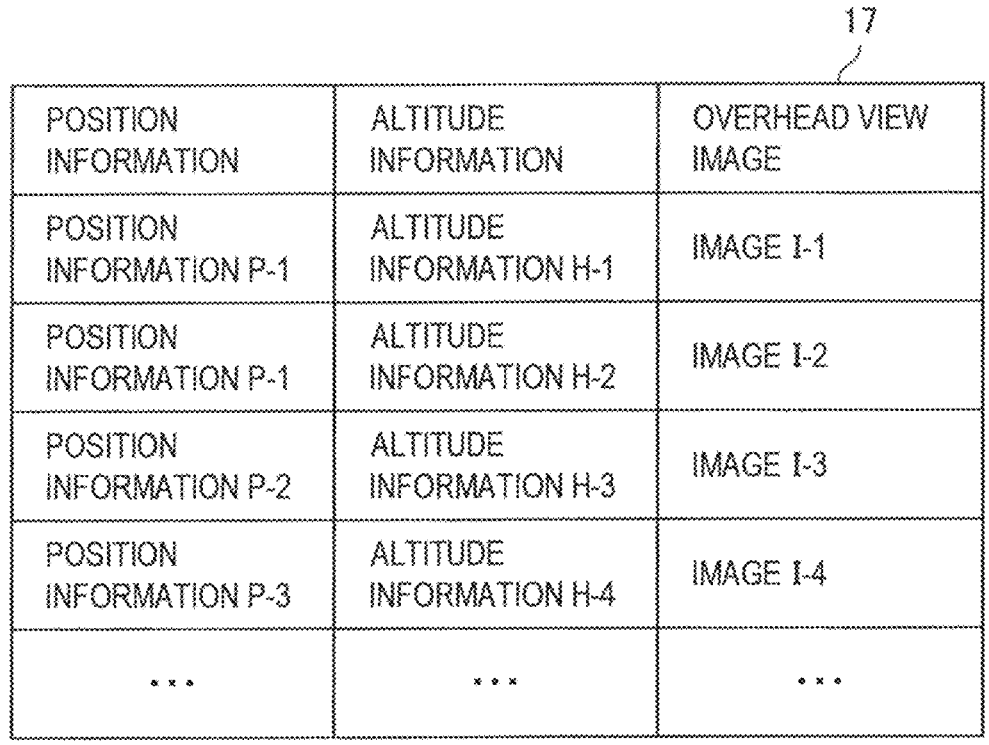
FIG. 3 is a diagram illustrating an example of data stored in an overhead view image DB.

An example of data stored in the overhead view image DB 17 is illustrated in FIG. 3. As shown in FIG. 3, overhead view images I-1 to I-4 are associated with position information P-1 to P-3 and altitude information H-1 to H-4, respectively. In the example shown in FIG. 3, the overhead view image I-1 shows scenery from the position P-1 and the height H-1. Meanwhile, the overhead view image I-2 shows scenery from the same position P-1 but a different height H-2. Specifically, overhead view images obtained from the same position but at different heights, for example, scenery from a first observation platform and scenery from a second observation platform in the same tower or scenery from a fifth floor and scenery from an eighth floor in the same building, can be stored.

Flash memory such as card type memory is, for example, used as the captured image memory 19. The captured image memory 19 may also be a recording medium like a DVD (Digital Versatile Disc) or the like. Further, the captured image memory 19 need not be such a removal memory medium, but may be a hard disk device.

The captured image memory 19 may store as captured images images of a subject, which have been sequentially output from the camera module 15, in response to an operation timing of a shutter button.

The CPU 10 performs control for each configuration of the digital camera 1. The CPU 10 (the determination unit) in accordance with the present embodiment recognizes a position (for example, an xy coordinate position) indicated by a user in a real image displayed on the display unit 21 and determines whether an overhead view image is associated with the recognized position. The indication by the user may be, for example, indicating an object (an object such as a building or a mountain) in a real image or indicating a part excluding the object (such as a part of the sky) in the real image. The operation input unit 16 outputs a detected user operation (of indicating a position) to the CPU 10 (the determination unit). The CPU 10 (the determination unit) may also recognize that a particular floor number of a building is indicated in the real image based on the user operation detected by the operation input unit 16.

The overhead view image associated with the recognized position may be an overhead view image associated with position information and altitude information in real space of (a part of) an object displayed at an xy coordinate position recognized as a position indicated by a user in a real image.

Additionally, the CPU 10 (the determination unit) may identify an object in a real image based on the current position of the digital camera 1 acquired by the GPS measurement unit 14, the image capturing direction and image recognition of the camera module 15 or the like.

The CPU 10 may also extract an overhead view image associated with the recognized position from the overhead view image DB 17 or via the network I/F 22 from a particular server or a plurality of indefinite servers on the network.

The ROM 11 stores programs or the like for performing a process of recognizing a position indicated by a user and a process of determining whether an overhead view image is associated with the indicated position in addition to a program for executing an image capturing function. The programs stored in the ROM 11 are executed by the CPU 10 with the RAM 12 used as a work area.

The display control unit 20 performs control so that display content of a display screen is displayed on the display unit 21 in accordance with control by the CPU 10 based on the programs in the ROM 11. The Display control unit 20 in accordance with the present embodiment, if an overhead view image associated with a position indicated by a user is extracted from the overhead view image DB 17 by the CPU 10 (the determination unit), performs control of displaying the overhead view image on the display unit 21. Additionally, when a plurality of overhead view images associated with the position indicated by the user are present, the display control unit 20 may display the plurality of overhead view images on the display unit 21. As described above, a plurality of the overhead view images associated with even the same position (image capturing place) may be associated with different heights, directions and angles of elevation.

The display unit 21 displays an image of a subject output from the camera module 15 in addition to a menu screen, various types of operation screens or the like in real time, and a captured image stored in the captured image memory 19 in accordance with control of the display control unit 20. The display unit 21 is realized using a LCD (Liquid Crystal Display), an OLED (Organic Light-Emitting Diode) or the like, for example.

The display unit 21 in accordance with the present embodiment displays an overhead view image associated with the position indicated by the user.

Additionally, although the display control unit 20 controls display of the display unit 21 included in the digital camera 1 in the present embodiment, a device controlled in accordance with the present embodiment is not limited to the display unit 21. For example, the display control unit 20 may control display of an external display apparatus connected to the digital camera 1.

The network I/F 22 is a communication module for transmitting data to and receiving data from an external apparatus. For example, the network I/F 22 in accordance with the present embodiment may connect to an image server on the network and acquire an overhead view image associated with the position indicated by the user.

The configuration of the digital camera 1 in accordance with the first embodiment has been described in detail above. Next, a display control process in accordance with the present embodiment will be described with reference to FIG. 4.

(2-1-2. Display Control Process)

Figure 4:
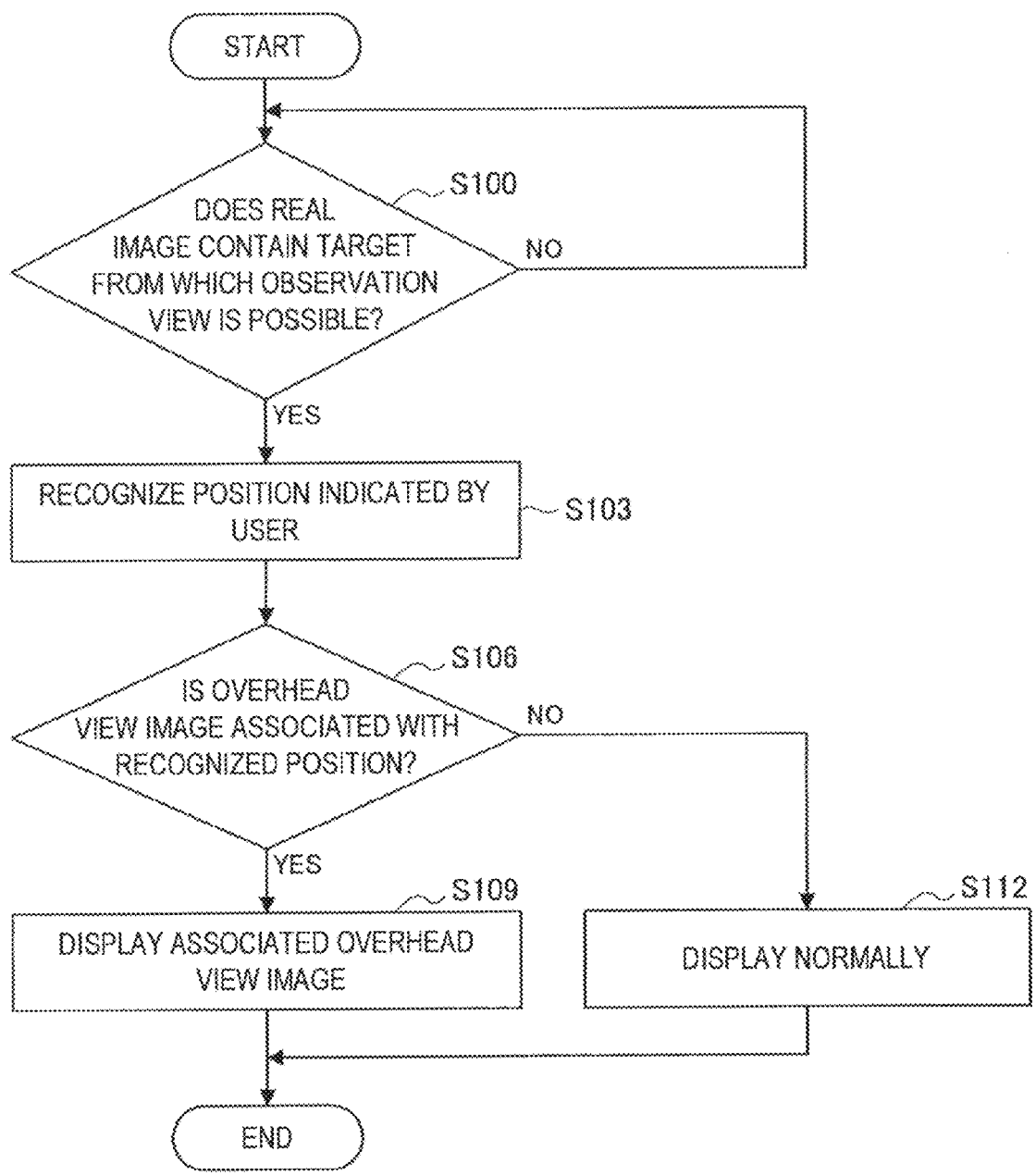
FIG. 4 is a flowchart illustrating a display control process in accordance with the first embodiment of the present disclosure.

FIG. 4 is a flowchart illustrating a display control process in accordance with the present embodiment. As illustrated in FIG. 4, in step S103, the CPU 10 first determines whether a real image captured by the camera module 15 and displayed on the display unit 21 includes a target (objects including artificial and natural objects) from which an observation view (display of an overhead view image) is possible.

Next, when the real image includes a target from which an observation view is possible in step S103, the digital camera 1 recognizes a position (for example, an xy coordinate position) indicated by a user in the real image.

Then, in step S106, the digital camera 1 determines whether an overhead view image is associated with the recognized position. Specifically, the digital camera 1 determines that "an overhead view image is present" when a tag indicating that the overhead view image is present is attached to the recognized position (the xy coordinate position), for example. The digital camera 1 may also determine that "an overhead view image is present" when it is possible to retrieve an overhead view image associated with position information and altitude information of a target in a real space that is displayed at the recognized position (the xy coordinate position) from the overhead view image DB 17 or the network.

Next, when it is determined in step S106 that the overhead view image is present, the digital camera 1 displays the corresponding overhead view image on the display unit 21 in step S109. Specifically, the digital camera 1 may acquire the corresponding overhead view image from the overhead view image DB 17 thereof, or from a given server on the network or a plurality of indefinite servers on the network.

Meanwhile, when it is determined in step S106 that the overhead view image is absent, the digital camera 1 keeps displaying a real image as usual in step S112.

The fundamental display control process in accordance with the present embodiment has been described in detail above. Next, a method for a user to indicate a position in a real image will be described in detail with reference to a plurality of examples.

(2-1-3. Indication of Position)

Display of Binoculars Icon

In the above-described embodiment, when an overhead view image is associated with a position indicated by a user, the overhead view image is displayed. However, in particular, with which position in a real image the overhead view image is associated has not been explicitly shown in advance.

Therefore, when it is determined that the real image includes a target from which an overhead view image (an observation view) is possible, the display control unit 20 (see step S100) may explicitly shows a position (an observation view point) associated with the overhead view image. Accordingly, a user can intuitively understand which point (position) in the real image should be indicated in order to display an observation view (an overhead view image).

Figure 5:
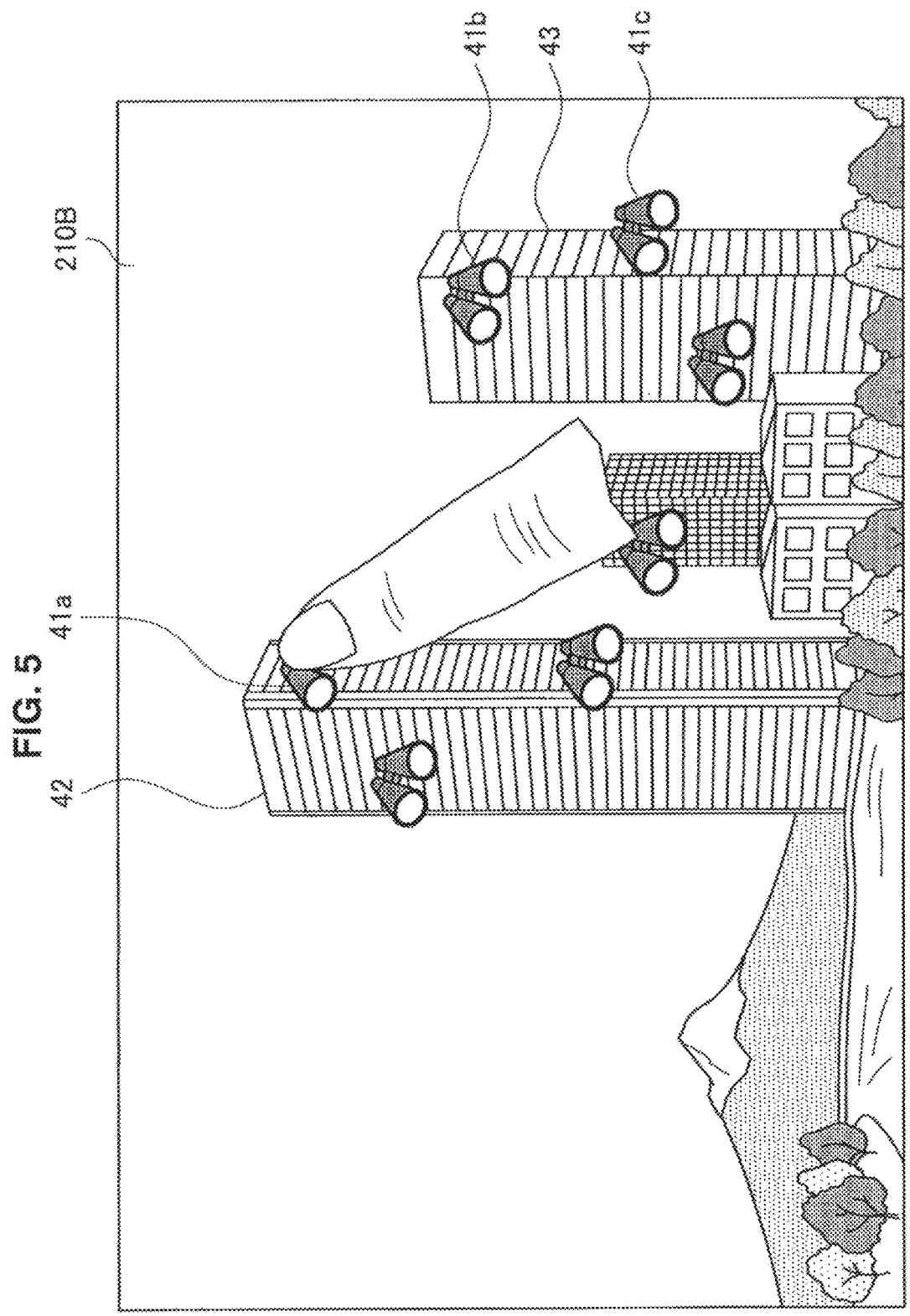
FIG. 5 is a diagram illustrating an indication example of an observation view point in accordance with the present embodiment.

Specifically, as illustrated in FIG. 5, for example, the digital camera 1 may display a real image 210B so that binoculars icons 41 (41*a* to 41*c*) are superimposed on the respective observation view points of the real image 210B. In this case, the display control unit 20 may control the binoculars icons 41 to be displayed at portions (positions) of the target corresponding to an altitude indicated by the altitude information associated with the overhead view image.

For example, if an overhead view image associated with a building 42 shown in the real image 210B has the altitude information indicative of the height of an observation platform of the building 42, the display control unit 20 controls the binoculars icon 41*a* to be displayed at the observation platform portion of the building 42, as illustrated in FIG. 5. Also, when an overhead view image having the altitude information indicative of particular floors of a target building 43 is associated with the building 43, the display control unit 20 controls the binoculars icons 41*b* and 41*c* to be displayed at the particular floors of the building.

Thumbnail Display

Although uniform icons are displayed at points from which an observation view is possible in the above-mentioned display example of binoculars icons, the display control unit 20 in accordance with the present embodiment may display a thumbnail of each overhead view image such that the thumbnail is superimposed on the real image.

When a target from which an observation view is possible is indicated, the digital camera 1 in accordance with the present embodiment may display thumbnails of a plurality of overhead view images associated with the target in the corresponding portions of the target based on the altitude information of the respective overhead view images.

Figure 6:
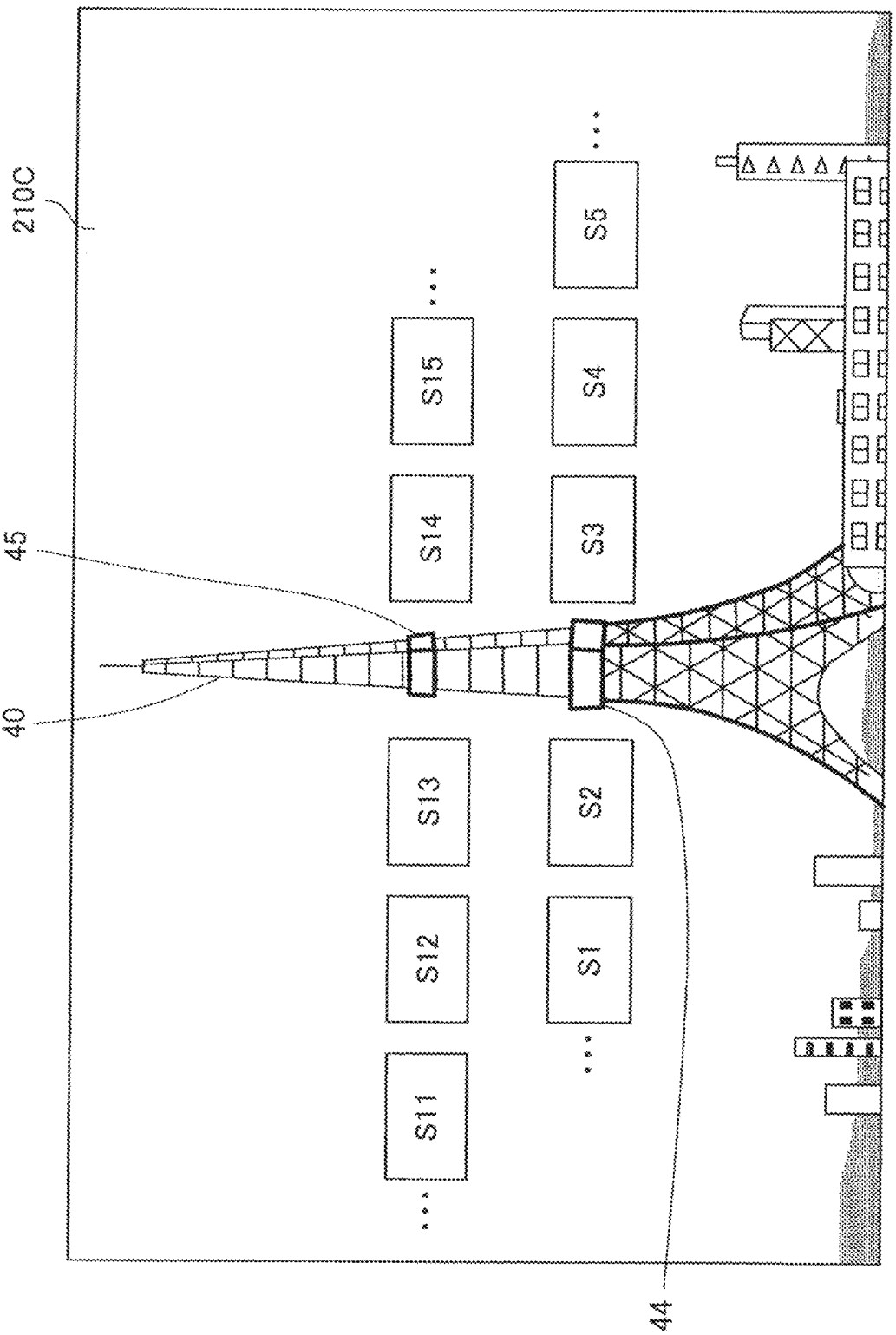
FIG. 6 is a diagram illustrating display examples of thumbnails in accordance with the present embodiment.

If the target tower 40, from which an observation view is possible, is indicated by a user in the real image 210C as illustrated in FIG. 6, for example, the display control unit 20 displays thumbnails S1 to S15 of overhead view images associated with the tower 40. Here, the display control unit 20 may dispose, at positions substantially horizontal with respect to a first observation platform 44 of the tower 40 in the real image 210C, the corresponding thumbnails S1 to S5 based on altitude information included in the respective overhead view images. The display control unit 20 may also dispose, at positions substantially horizontal with respect to a second observation platform 45 of the tower 40 in the real image 210C, the corresponding thumbnails S11 to S15.

A user selects one of the displayed thumbnails S1 to S15. The display control unit 20 performs control so that an original image (an overhead view image) of the selected thumbnail is displayed on the display unit 21.

Indication of Position by Zoom Operation

In the above-mentioned embodiment, a user touches a real image to indicate a position. However, an operation example for indicating a position in accordance with the present embodiment is not limited thereto. A position may be indicated by operating a pointer (not shown) displayed in a real image. A position may also be indicated by a zoom operation.

Figure 7:
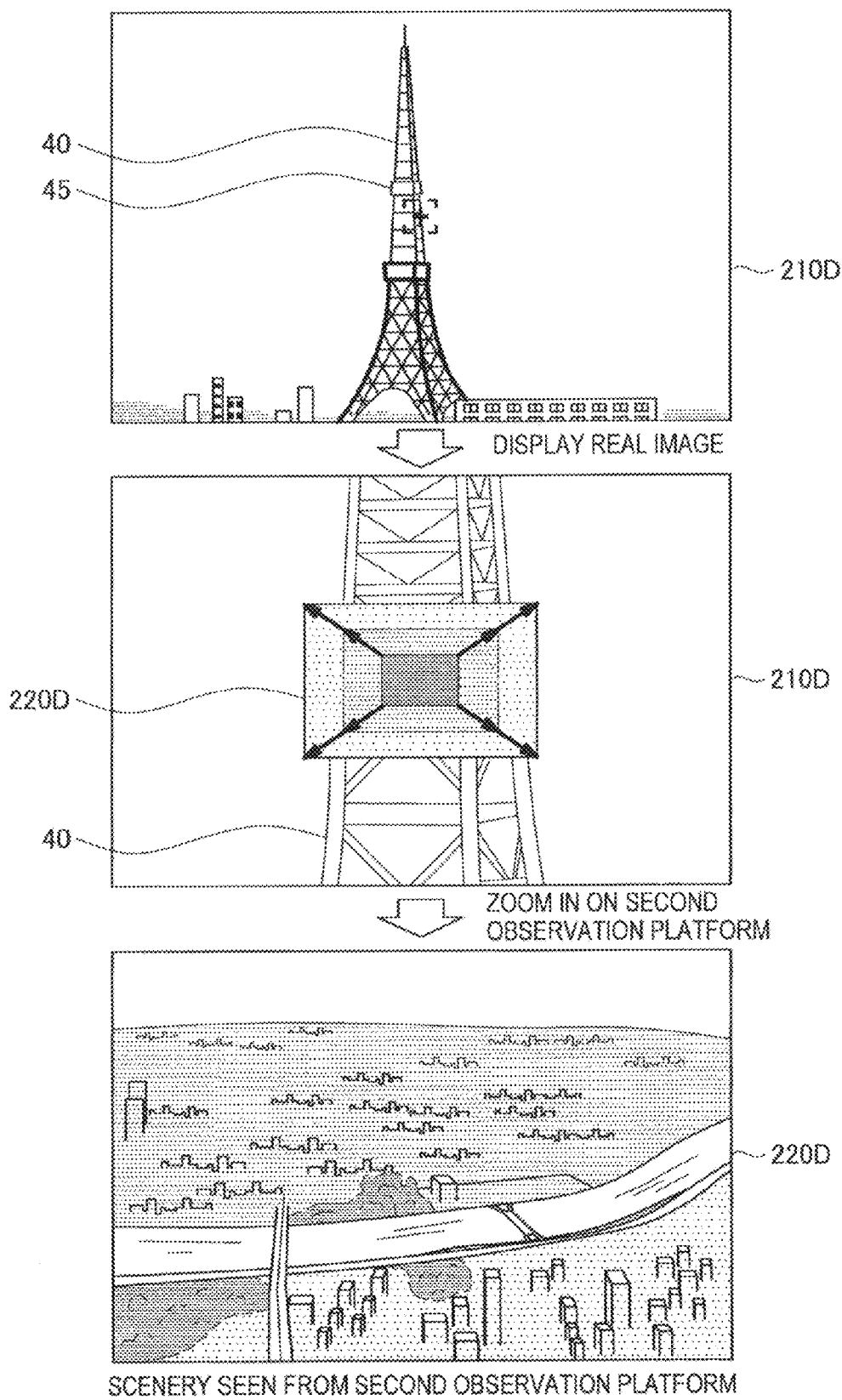
FIG. 7 is a transition diagram of a screen illustrating indication of a position by a zoom operation in accordance with the present embodiment.

For example, as illustrated in FIG. 7, when the real image 210D is displayed, a position may be indicated by performing a zoom-in operation on a second observation platform 45 of the target tower 40 from which an observation view is possible.

In such a case, the display control unit 20 may, as illustrated in FIG. 7, for example, zoom in on and cause the real image 210D to fade out and may zoom in on and cause the overhead view image 220D associated with the indicated position (the second observation platform 45 herein) to fade in substantially concurrently.

(2-1-4. Other Examples of Target)

In the above-mentioned embodiment, a tower, a building and an artificial object such as a building have been described as examples of a target from which an observation view is possible. However, the target in accordance with the present embodiment is not limited thereto. For example, the target may be a natural object having an altitude. Cases where a target from which an observation view is possible is a natural object are described in detail below.

Case where Mountain is Indicated

For example, as illustrated in FIG. 8, when a mountain 47 in the real image 210E is indicated, the CPU 10 (the determination unit) determines whether scenery (an overhead view image) from the mountain 47, which is associated with the indicated mountain 47, is present.

Then, when an overhead view image associated with the mountain 47 is present, the display control unit 20 switches the display to an overhead view image 220E as illustrated in FIG. 8.

Case where the Sky is Indicated

Next, display control performed when the sky, which is a natural object having an altitude, is indicated will be described in detail with reference to FIG. 9. As illustrated in the left of FIG. 9, when a user 50 directs a digital camera 1 toward a building 42, which is a skyscraper, a real image 210F is displayed on a display unit 21. A plurality of overhead view image patterns are conceivable, as illustrated in the right of FIG. 9, when the user 50 indicates a part of the sky 49 in the real image 210F.

As a first pattern, when a part of the sky in a real image is indicated, an overhead view image obtained by looking down on the current position of the user 50 from right above may be displayed. When a part of the sky 49 is indicated, for example, the CPU 10 (the determination unit) determines whether, as an overhead view image associated with a position (the current position of the user 50) represented by position information output from the GPS measurement unit 14, an overhead view image obtained by capturing the current position from the sky above is present. Then, as illustrated in the upper right of FIG. 9, the display control unit 20 displays on the display unit 21 an overhead view image 220F obtained by looking down on the current position of the user 50 from above.

As a second pattern, when a part of the sky in a real image is indicated, an overhead view image obtained by looking down on a landmark such as a building or a sightseeing spot that has a feature serving as a mark in the real image from the indicated position may be displayed.

For example, when a part of the sky 49 in the real image 210F illustrated in the left of FIG. 9 is indicated, the CPU 10 (the determination unit) determines whether an overhead view image obtained by looking down on (capturing from the sky above) a landmark in the real image 210F from the indicated position is present. As shown in the left of FIG. 9, a building 42, which is a skyscraper, is shown in the real image 210F as an example of a landmark. Accordingly, the CPU 10 (the determination unit) determines whether the overhead view image 220G obtained by looking down on the building 42 is associated with the indicated position. Additionally, although a method for detecting (recognizing) a landmark in a real image is not particularly limited herein, the CPU 10 may detect the landscape by using, for example, position information of the digital camera 1, an image capturing direction, image processing, a landmark database or the like.

As a third pattern, when a part of the sky in a real image is indicated, an overhead view image obtained by looking down on a landmark such as a building, a sightseeing spot that has a feature serving as a mark in the real image from right above may be displayed.

For example, when a part of the sky 49 in the real image 210F illustrated in the left of FIG. 9 is indicated, the CPU 10 (the determination unit) determines whether an overhead view image obtained by looking down on (capturing from the sky above) a landmark in the real image 210F from above is present. As described above, since the building 42, which is a skyscraper, is shown in the real image 210F as an example of a landmark, the CPU 10 (the determination unit) determines whether the indicated position is associated with an overhead view image 220H obtained by looking down on the building 42 from above.

The first embodiment has been described in detail above. In accordance with the present embodiment, when an overhead view image is present that is captured from a position corresponding to a given altitude indicated by a user in a real image, a screen can switch display to the overhead view image. Accordingly, the user feels as if he/she instantaneously moved to the indicated position in the real image and can enjoy a view from that position (at that altitude).

2-2. Second Embodiment

In the above-described first embodiment, the digital camera 1 determines whether an overhead view image associated with a position indicated by a user is present. However, a subject that determines the presence or absence of an overhead view image in accordance with the present disclosure is not limited to the digital camera 1. For example, the presence or absence of an overhead view image may be determined on a server side. A second embodiment, in which a server side determines the presence or absence of an overhead view image, is described in detail below with reference to FIGS. 10 and 11.

(2-2-1. System Configuration)

Figure 10:
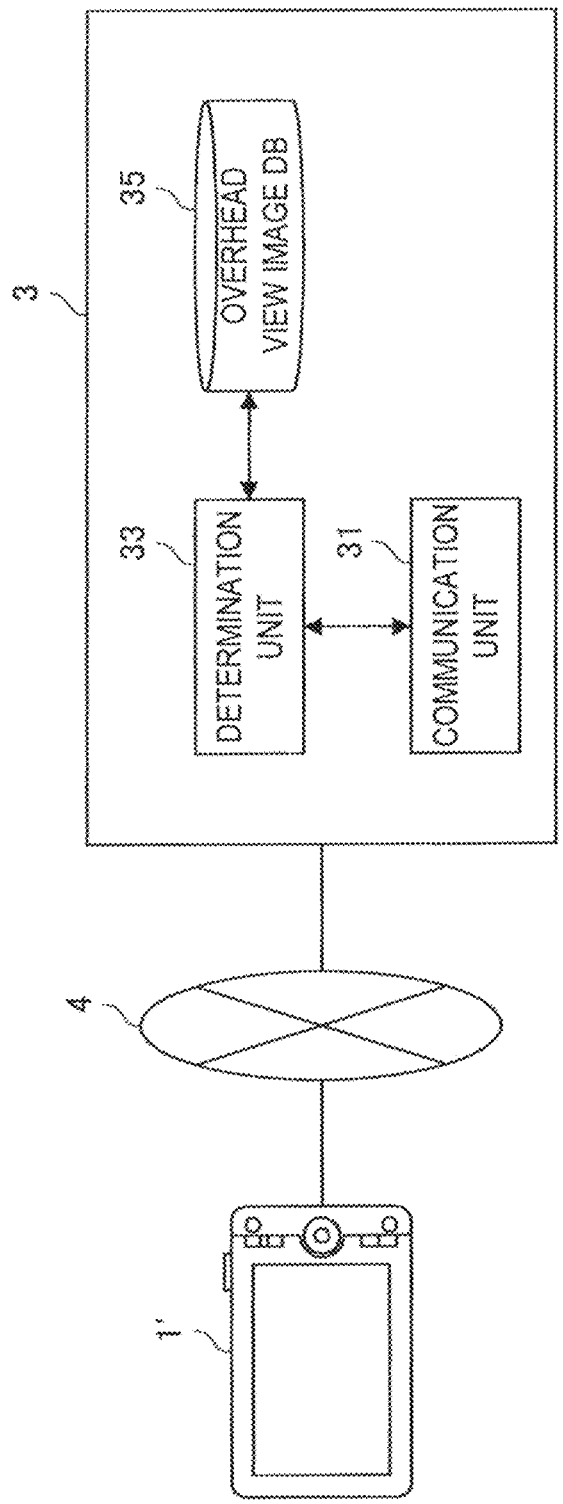
FIG. 10 is a diagram illustrating a system configuration in accordance with a second embodiment of the present disclosure.

FIG. 10 is a diagram illustrating the system configuration of an observation view system in accordance with the second embodiment. As illustrated in FIG. 10, the observation view system of the present embodiment includes a digital camera 1' and a server 3. Further, the digital camera 1' and the server 3 are connected to each other via network 4.

The configuration of the digital camera 1' in accordance with the present embodiment may exclude the overhead view image DB 17 from each configuration illustrated in FIG. 2. Further, the CPU 10 need not have a function of a determination unit. The sever 3 has an overhead view image DB and a determination unit in the present embodiment as described below.

As illustrated in FIG. 10, the server 3 in accordance with the present embodiment has a communication unit 31, a determination unit 33 and an overhead view image DB 35. The communication unit 31 is connected to the digital camera 1' via a network 4 and transmits data to and receives data from the digital camera 1'. Specifically, the communication unit 31, for example, receives from the digital camera 1' indicated position information indicative of a position indicated by a user. The communication unit 31 also transmits to the digital camera 1' an overhead view image extracted by the determination unit 33 from the overhead view image DB 35 based on the received indicated position information.

The determination unit 33 has a similar function to the determination unit of the CPU 10 of the digital camera 1 in accordance with the above-described first embodiment. Specifically, the determination unit 33 determines whether an overhead view image associated with a position represented by the indicated position information is present. Further, when the determination unit 33 determines that an associated overhead view image is present, the overhead view image is extracted from the overhead view image DB 35 and output to the communication unit 31.

Similarly to the overhead view image DB 17 of the digital camera 1 in accordance with the above-described first embodiment, the overhead view image DB 35 is a storage unit storing an overhead view image associated with position information (latitude and longitude information) and altitude information (see FIG. 3). Additionally, an overhead view image showing scenery from an observation platform, for example, may be generated from an image of a telescope that is actually located in the tower, and uploaded to the server 3.

The system configuration of the observation view system in accordance with the second embodiment has been described above. Next, a display control process in accordance with the present embodiment will be described with reference to FIG. 11.

(2-2-2. Display Control Process)

FIG. 11 is a flowchart illustrating a display control process in accordance with the present embodiment. As illustrated in FIG. 11, in step S123, the digital camera 1' first recognizes a position (for example, an xy coordinate position) indicated by a user in a real image displayed on the display unit 21.

Then, in step S126, the digital camera 1' transmits information regarding the recognized position indicated by the user (indicated position information) to the server 3. Herein, the indicated information transmitted to the server 3 may, for example, include position information and altitude information in a real space regarding a target displayed at the indicated position (the xy coordinate position) in the real image. Alternatively, the digital camera 1' may transmit the indicated position (the xy coordinate position) and the real image to the server 3.

Next, in step S129, the determination unit 33 of the server 3 determines whether an overhead view image is associated with a position represented by the indicated position information received by the communication unit 31 from the digital camera 1. Specifically, the determination unit 33 may, for example, determine that "an overhead view image is present" when an associated overhead view image can be retrieved from the overhead view image DB 17 based on the position information and the altitude information in the real space of a target displayed at the indicated position (the xy coordinate position) in the real image.

Next, in step S132, if it is determined in step S129 that an overhead view image is present, the server 3 transmits the associated overhead view image to the digital camera 1'.

Then, in step S135, the digital camera 1' performs control so that the overhead view image received from the server 3, that is, the overhead view image associated with the position indicated by the user is displayed on the display unit 21.

The display control process in accordance with the second embodiment has been described in detail above. Additionally, the digital camera 1' may transmit a real image to the server 3 in advance before step S123 and the server 3 may determine the presence or absence of an object from which an observation view is possible in the real image and transmit the determination result to the digital camera 1'.

As discussed above, in accordance with the second embodiment, the server 3 determines the presence or absence of an overhead view image associated with a position indicated by a user in a real image. If so, the server 3 can transmit the overhead view image to the digital camera 1.

3. CONCLUSION

As discussed above, if a given position is indicated in a real image, the observation view system in accordance with the present embodiment can switch display to an overhead view image (an observation view) obtained by looking down at a height corresponding to the indicated position. Accordingly, a user feels as if he/she instantaneously moved to the position indicated by himself/herself in the real image and can enjoy a view at that position (height).

It should be understood by those skilled in the art that various modifications, combinations, sub-combinations and alterations may occur depending on design requirements and other factors insofar as they are within the scope of the appended claims or the equivalents thereof.

For example, the display control unit 20 may perform display control such that an object indicated by a user and overhead view images associated with the object (indicated positions thereof) are arranged on the display unit 21.

In addition, the overhead view image may be an image captured by a fixed camera or a live camera located at an object.

In addition, the overhead view image is not limited to a still image in the present specification, and may be a moving image, for example. The digital camera 1 in accordance with the present embodiment may also be capable of capturing and recording not only a still image or the like, but also a moving image.

Further, although the embodiment described above illustrates a case where, if a user indicates a given position in a real image, the display switches to an overhead view image captured at a height corresponding to the indicated position, the switching of display in accordance with the present disclosure is not limited thereto. For example, the display control unit 20 may first display an overhead view image at a predetermined height of a position closer to the current position of a user than a position indicated by position information of an overhead view image associated with an indicated position, and then may switch display to the overhead view image associated with the indicated position.

As described above, when other overhead view images are displayed before display of a real image is switched to an overhead view image associated with an indicated position, a user can feel as if he/she flew and moved to the indicated position through the sky.

In the above-described embodiment, a point from which an observation view is possible is explicitly indicated by displaying a binoculars icon such that the binoculars icon is superimposed on a position associated with an overhead view image in a real image. However, the indication method in accordance with the present disclosure is not limited thereto. For example, an effect may be applied such that light looks to surround a position or an object associated with an overhead view image in a real image.

Additionally, the present technology may also be configured as below.

(1) A client terminal including:
a determination unit configured to determine whether an overhead view image is associated with a position indicated by a user; and
a display control unit configured to perform control so that the overhead view image is displayed on a display unit in accordance with a determination result obtained by the determination unit.

(2) The client terminal according to (1), wherein the overhead view image is scenery at an altitude corresponding to the position indicated by the user.

(3) The client terminal according to (1) or (2), wherein the display control unit performs display of indicating a position with which the overhead view image is associated on a displayed image.

(4) The client terminal according to any one of (1) to (3), wherein the determination unit recognizes a position indicated by a user in a real image, the real image being a captured image of real space displayed on the display unit.

(5) The client terminal according to any one of (1) to (4), wherein indication by the user is indicating an object in a real image displayed on the display unit.

(6) The client terminal according to any one of (1) to (5), wherein indication by the user is indicating a part of sky in a real image displayed on the display unit.

(7) The client terminal according to any one of (1) to (6), wherein indication by the user is indicating a particular floor number of a building in a real image displayed on the display unit.

(8) The client terminal according to any one of (1) to (7), wherein, when a plurality of overhead view images are associated with the position indicated by the user, the display control unit controls the plurality of overhead view images to be displayed on the display unit.

(9) The client terminal according to (8), wherein the plurality of overhead view images differ in at least one of an altitude, a direction or an angle of elevation.

(10) The client terminal according to any one of (1) to (9), wherein the overhead view image is a panorama image obtained by looking around from the position indicated by the user.

(11) The client terminal according to any one of (1) to (10), wherein indication by the user is realized by a zoom operation.

(12) The client terminal according to (5), wherein the display control unit controls the object indicated by the user and an overhead view image associated with the object to be displayed on the display unit.

(13) A server including:
a receiving unit configured to receive indicated position information indicative of a position indicated by a user at a client terminal;
a determination unit configured to determine whether an overhead view image is associated with the position indicated by the indicated position information; and
a transmitting unit configured to transmit to the client terminal the overhead view image associated with the position indicated by the indicated position information in accordance with a determination result obtained by the determination unit.

(14) A recording medium having a program recorded thereon, the program being configured to cause a computer to execute:

a determination process of determining whether an overhead view image is associated with a position indicated by a user; and a control process of controlling the overhead view image to be displayed on a display unit in accordance with a determination result obtained in the determination process.

(15) A recording medium having a program recorded thereon, the program being configured to cause a computer to execute:

a reception process of receiving, indicated position information indicative of a position indicated by a user at a client terminal;

a determination process of determining whether an overhead view image is associated with the position indicated by the indicated position information; and a transmitting process of transmitting to the client terminal the overhead view image associated with the position indicated by the indicated position information in accordance with a determination result obtained in the determination process.

The present disclosure contains subject matter related to that disclosed in Japanese Priority Patent Application JP 2012-038423 filed in the Japan Patent Office on Feb. 24, 2012 the entire content of which is hereby incorporated by reference.

What is claimed is:

1. A client terminal comprising:
a central processing unit (CPU) and a memory storing instructions for execution by the CPU, wherein the CPU is configured to:
   determine whether an overhead view image is associated with an elevated position indicated by a user, the overhead view image being a downward image captured from the elevated position indicated by the user, wherein the indication by the user is indicating a part of sky in a real image displayed on a display; and
   perform control so that the overhead view image is displayed on the display in response to the determination that the overhead view image is associated with the elevated position indicated by the user.

2. The client terminal according to claim 1, wherein the overhead view image is scenery at an altitude corresponding to the elevated position indicated by the user.

3. The client terminal according to claim 1, wherein the CPU is configured to perform display of indicating the elevated position with which the overhead view image is associated on a displayed image.

4. The client terminal according to claim 1, wherein the CPU is configured to recognize the elevated position indicated by the user in the real image, the real image being a captured image of real space displayed on the display.

5. The client terminal according to claim 1, wherein the indication by the user is indicating an object in the real image displayed on the display.

6. The client terminal according to claim 5, wherein the CPU is configured to control the object indicated by the user and an overhead view image associated with the object to be displayed on the display.

7. The client terminal according to claim 1, wherein the indication by the user is indicating a particular floor number of a building in the real image displayed on the display.

8. The client terminal according to claim 1, wherein, when a plurality of overhead view images are associated with the elevated position indicated by the user, the CPU is configured to control the plurality of overhead view images to be displayed on the display.

9. The client terminal according to claim 8, wherein the plurality of overhead view images differ in at least one of an altitude, a direction or an angle of elevation.

10. The client terminal according to claim 1, wherein the overhead view image is a panorama image obtained by looking around from the elevated position indicated by the user.

11. The client terminal according to claim 1, wherein the indication by the user is realized by a zoom operation.

12. A server comprising:
a determination unit and a memory storing instructions for execution by the determination unit, wherein the determination unit is configured to:
   receive indicated position information indicative of an elevated position indicated by a user at a client terminal;
   determine whether an overhead view image is associated with the elevated position indicated by the indicated position information, the overhead view image being a downward image captured from the elevated position indicated by the user, wherein the indication by the user is indicating a part of sky in a real image displayed on a display; and
   transmit to the client terminal the overhead view image associated with the elevated position indicated by the indicated position information in response to the determination that the overhead view image is associated with the elevated position indicated by the indicated position information.

13. A non-transitory computer-readable storage medium storing computer-readable instructions thereon which, when executed by a computer, cause the computer to perform a method comprising:
determining whether an overhead view image is associated with an elevated position indicated by a user, the overhead view image being a downward image captured from the elevated position indicated by the user, wherein the indication by the user is indicating a part of sky in a real image displayed on a display; and
controlling the overhead view image to be displayed on the display in response to the determination that the overhead view image is associated with the elevated position indicated by the user.

14. A non-transitory computer-readable storage medium storing computer-readable instructions thereon, which, when executed by a computer, cause the computer to perform a method comprising:
receiving indicated position information indicative of an elevated position indicated by a user at a client terminal;
determining whether an overhead view image is associated with the elevated position indicated by the indicated position information, the overhead view image being a downward image captured from the elevated position indicated by the user,
wherein the indication by the user is indicating a part of sky in a real image displayed on a display; and
transmitting to the client terminal the overhead view image associated with the elevated position indicated by the indicated position information in response to the determination that the overhead view image is associated with the elevated position indicated by the indicated position information.

* * * * *